L. G. BLYSTONE.
FRICTION CLUTCH.
APPLICATION FILED OCT. 4, 1912.
1,064,435.  Patented June 10, 1913.
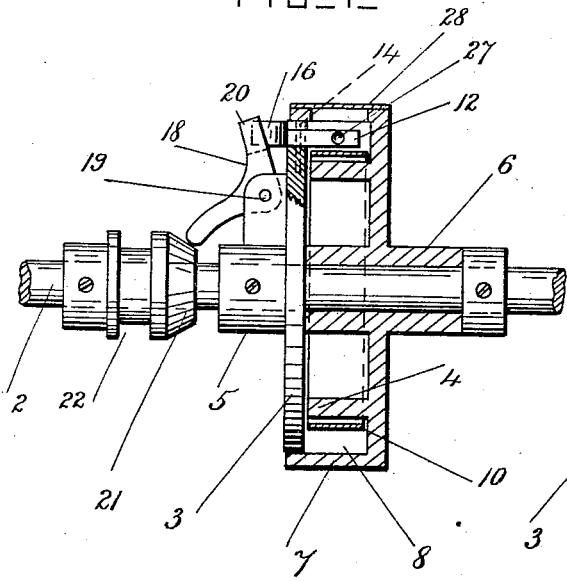
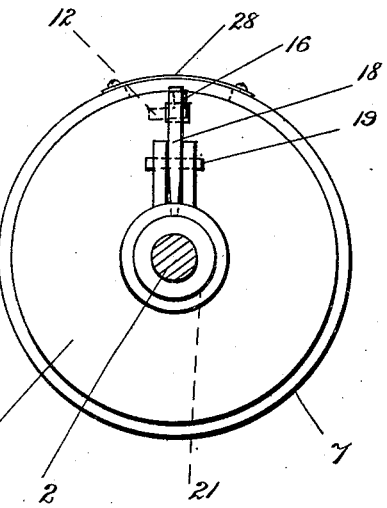
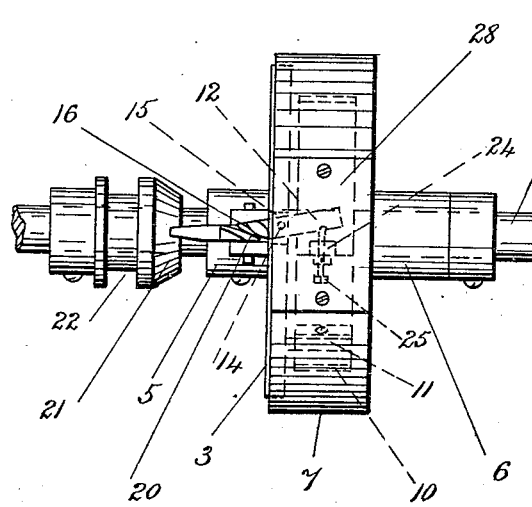
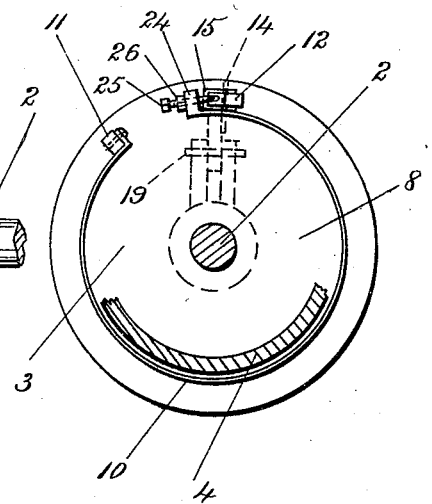
Witnesses
H. Carter.
Wm H. Bates
Inventor
Lawrence G. Blystone,
By Hubert W. Jenner.
Attorney

UNITED STATES PATENT OFFICE.

LAWRENCE G. BLYSTONE, OF CAMBRIDGE SPRINGS, PENNSYLVANIA.

FRICTION-CLUTCH.

1,064,435.	Specification of Letters Patent.	Patented June 10, 1913.

Application filed October 4, 1912.   Serial No. 723,895.

*To all whom it may concern:*

Be it known that I, LAWRENCE G. BLYSTONE, a citizen of the United States, residing at Cambridge Springs, in the county of Crawford and State of Pennsylvania, have invented certain new and useful Improvements in Friction-Clutches; and I do hereby declare the following to be a full, clear, and exact description of the invention, such as will enable others skilled in the art to which it appertains to make and use the same.

This invention relates to friction clutches provided with resilient bands; and it consists in the novel construction and combination of the parts hereinafter fully described and claimed.

In the drawings, Figure 1 is a side view of a clutch constructed according to this invention, showing the casing and a part of the clutch wheel in section. Fig. 2 is a plan view of the same. Fig. 3 is an end view of the clutch. Fig. 4 is an end view, looking in the opposite direction from the view shown in Fig. 3, with the casing removed, and showing a portion of the clutch wheel in section.

The clutch is mounted upon a driving shaft 2, and it is provided with two clutch members 3 and 4. The clutch member 3 is preferably a disk provided with a hub 5 which is secured on the shaft 2, and the clutch member 4 is preferably a wheel provided with a hub 6 which runs loose on the shaft. It is immaterial which of the two clutch members is secured to the shaft and which runs loose upon it. The wheel 4 is preferably provided with a peripheral flange 7 which overlaps the disk 3, and which forms a casing or chamber 8 which incloses the resilient clutch band and its connections.

The clutch band 10 is preferably formed of thin resilient metal, and one end of it is secured to a lug 11 which projects laterally from the disk 3. A clutch lever 12 is pivoted to the disk 3 by a pin 4, and is arranged parallel to the axis of the clutch members, and the other end of the clutch band 10 is operatively connected with one end portion of the clutch lever 12. The lever 12 projects through a hole 15 in the disk, and it is provided with an inclined projection 16 on its outer end. A bell-crank lever 18 is pivoted to the hub of the disk by a pin 19, and one arm of this bell-crank lever has an inclined portion 20 for engaging with the inclined projection 16. The other arm of the bell-crank lever engages with a conical sleeve 21 which is slidable longitudinally on the shaft, 2. This sleeve 21 is provided with a circumferential groove 22, or any other approved means whereby it may be slid upon the shaft by any approved operating device, such as a lever.

The clutch band is preferably connected to the clutch lever so that the length of the band can be adjusted, and for this purpose the band has preferably a block 24 secured to it. A set-screw 25 engages with a screw-threaded hole in the block 24 and is provided with a jam-nut 26. One end of the set-screw 25 engages with a recess 27 formed in the side of the clutch lever 12, and the set-screw is held loosely in engagement with the recess by the resiliency of the clutch band. A removable plate 28 is provided for giving access to the set-screw through a hand hole in the casing.

The clutch band is arranged so that it is normally out of engagement with the clutch wheel 4 which it encircles, and it is moved into frictional engagement with the clutch wheel by means of the conical sleeve, bell-crank lever and clutch lever. When the conical sleeve is slid away from the disk, the resiliency of the clutch band moves back the brake lever and the bell-crank lever and releases the clutch wheel.

What I claim is:

1. In a friction clutch, the combination with two clutch members, of a resilient clutch band having one end secured to one clutch member, a clutch lever pivoted to the said clutch member and arranged longitudinally of its axis and connected at one end to the said band, a bell-crank lever having its arms arranged at substantially a right angle to each other and having its middle part pivoted to the said clutch member, one arm of the bell-crank lever being arranged radially of the axis of the clutch members with its free end portion provided with means for imparting motion to the free end portion of the clutch lever, and means for moving the bell-crank lever pivotally to tighten the clutch band on the other clutch member.

2. In a friction clutch, the combination with a clutch disk having an opening at its periphery, of a clutch wheel of smaller diameter than the clutch disk and provided with a peripheral extension which overlaps the said disk and forms a chamber, a resilient clutch band arranged in the said chamber and having one end secured to the said disk, said band being adapted to engage with the said clutch wheel, a clutch lever pivoted to the clutch disk and projecting through its said opening and having its inner end connected with the clutch band, a bell-crank lever having its arms arranged at substantially a right angle to each other and having its middle part pivoted to the clutch disk, one arm of the bell-crank lever being arranged radially of the axis of the disk and wheel with its free end portion provided with means for imparting motion to the projecting outer end portion of the clutch lever, and means for moving the bell-crank lever pivotally to tighten the clutch band on the clutch wheel.

In testimony whereof I have affixed my signature in the presence of witnesses.

LAWRENCE G. BLYSTONE.

Witnesses:
J. A. BOLARD,
P. L. BLYSTONE,
F. W. HYATT.